(12) United States Patent
Katona et al.

(10) Patent No.: US 11,927,873 B2
(45) Date of Patent: Mar. 12, 2024

(54) METHOD OF SCANNING AN OPTICAL BEAM USING AN ACOUSTO-OPTIC DEFLECTOR DRIVEN BY CHIRPED ACOUSTIC SIGNALS

(71) Applicant: Femtonics Kft., Budapest (HU)

(72) Inventors: Gergely Katona, Budapest (HU); András Fehér, Szekszárd (HU); Máté Veress, Budapest (HU); Pál Maák, Budapest (HU); Gergely Szalay, Budapest (HU); Balázs Chiovini, Kecskemét (HU); Zoltán Szadai, Jászboldogháza (HU); Linda Sulcz-Judák, Akasztó (HU); Balázs József Rózsa, Budapest (HU)

(73) Assignee: Femtonics Kft., Budapest (HU)

( * ) Notice: Subject to any disclaimer, the term of this patent is extended or adjusted under 35 U.S.C. 154(b) by 616 days.

(21) Appl. No.: 17/268,199

(22) PCT Filed: Aug. 14, 2019

(86) PCT No.: PCT/HU2019/050039
§ 371 (c)(1),
(2) Date: Feb. 12, 2021

(87) PCT Pub. No.: WO2020/035710
PCT Pub. Date: Feb. 20, 2020

(65) Prior Publication Data
US 2021/0318590 A1    Oct. 14, 2021

(30) Foreign Application Priority Data
Aug. 14, 2018  (HU) .................................. P1800286

(51) Int. Cl.
*G02F 1/33* (2006.01)
*G01N 21/64* (2006.01)

(52) U.S. Cl.
CPC ............. *G02F 1/33* (2013.01); *G01N 21/645* (2013.01); *G01N 2021/6463* (2013.01); *G01N 2201/106* (2013.01)

(58) Field of Classification Search
CPC ......... G02F 1/33; G02F 1/113; G01N 21/645; G01N 2021/6463; G01N 2201/106; G02B 21/0036
(Continued)

(56) References Cited

U.S. PATENT DOCUMENTS 3,851,951 A * 12/1974 Eveleth ..................... G02F 1/33
                                                               359/310
4,929,042 A    5/1990 Hatori et al.
(Continued)

FOREIGN PATENT DOCUMENTS

WO    2013102771 A1    7/2013

*Primary Examiner* — William R Alexander
(74) *Attorney, Agent, or Firm* — Olson & Cepuritis, Ltd.

(57) ABSTRACT

The object of the invention relates to a method for scanning with an optical beam (50) using a first acousto-optic deflector (15, 15') having an optical axis along a Z-axis and at least one acousto-optic crystal layer (14), involving directing the optical beam (50) in the first acousto-optic deflector (15, 15'), and deflecting the optical beam (50) along an X-axis perpendicular to the Z-axis by means of the first acousto-optic deflector (15, 15), during which generating a plurality of acoustic chirp signals (30) in the at least one acousto-optic crystal layer (14) of the acousto-optic deflector (15, 15') by—generating a first acoustic chirp signal (30a) having a duration of τ in the acousto-optic crystal layer (14), then— generating a second acoustic chirp signal (30b) in the acousto-optic crystal layer (14) within a τ period of time counted from the start of the generation of the first acoustic chirp signal (30a).

20 Claims, 13 Drawing Sheets

Figure 1:
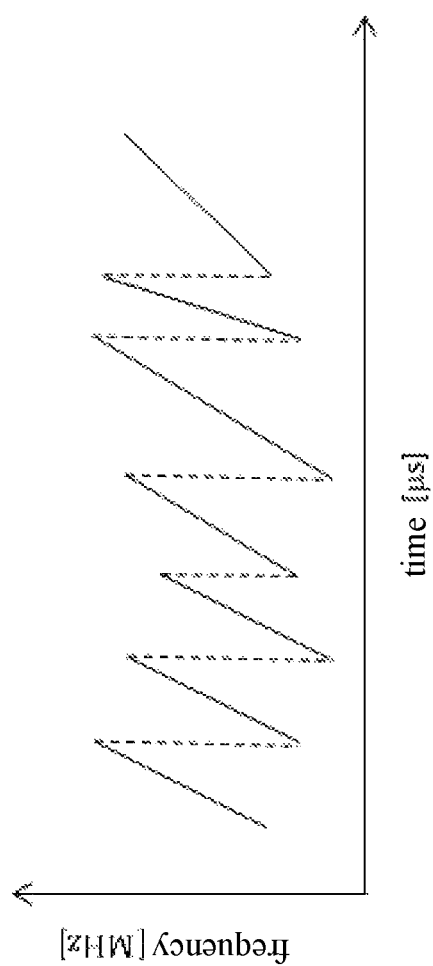

(58) Field of Classification Search
USPC .......................................................... 359/305
See application file for complete search history.

(56) References Cited

U.S. PATENT DOCUMENTS

| | | | |
|---|---|---|---|
| 5,717,401 A | | 2/1998 | Sabet-Peyman et al. |
| 5,805,743 A | * | 9/1998 | Iwamoto ................. G02F 1/335 |
| | | | 385/10 |
| 5,852,702 A | * | 12/1998 | Nishida .................... G02F 1/335 |
| | | | 385/10 |
| 6,775,051 B2 | * | 8/2004 | Sullivan ..................... G02F 1/33 |
| | | | 359/305 |
| 8,559,085 B2 | | 10/2013 | Maak et al. |
| 9,069,227 B2 | * | 6/2015 | Kirkby ..................... G02F 1/113 |
| 9,341,919 B2 | * | 5/2016 | Kirkby ............... G02B 21/0036 |
| 2002/0141035 A1 | | 10/2002 | Davidson et al. |
| 2002/0181119 A1 | * | 12/2002 | Sullivan ............... G01N 21/956 |
| | | | 359/641 |
| 2013/0148188 A1 | * | 6/2013 | Kirkby ................... G02B 21/16 |
| | | | 359/305 |
| 2014/0029081 A1 | * | 1/2014 | Kirkby .................... G02F 1/113 |
| | | | 359/310 |

* cited by examiner

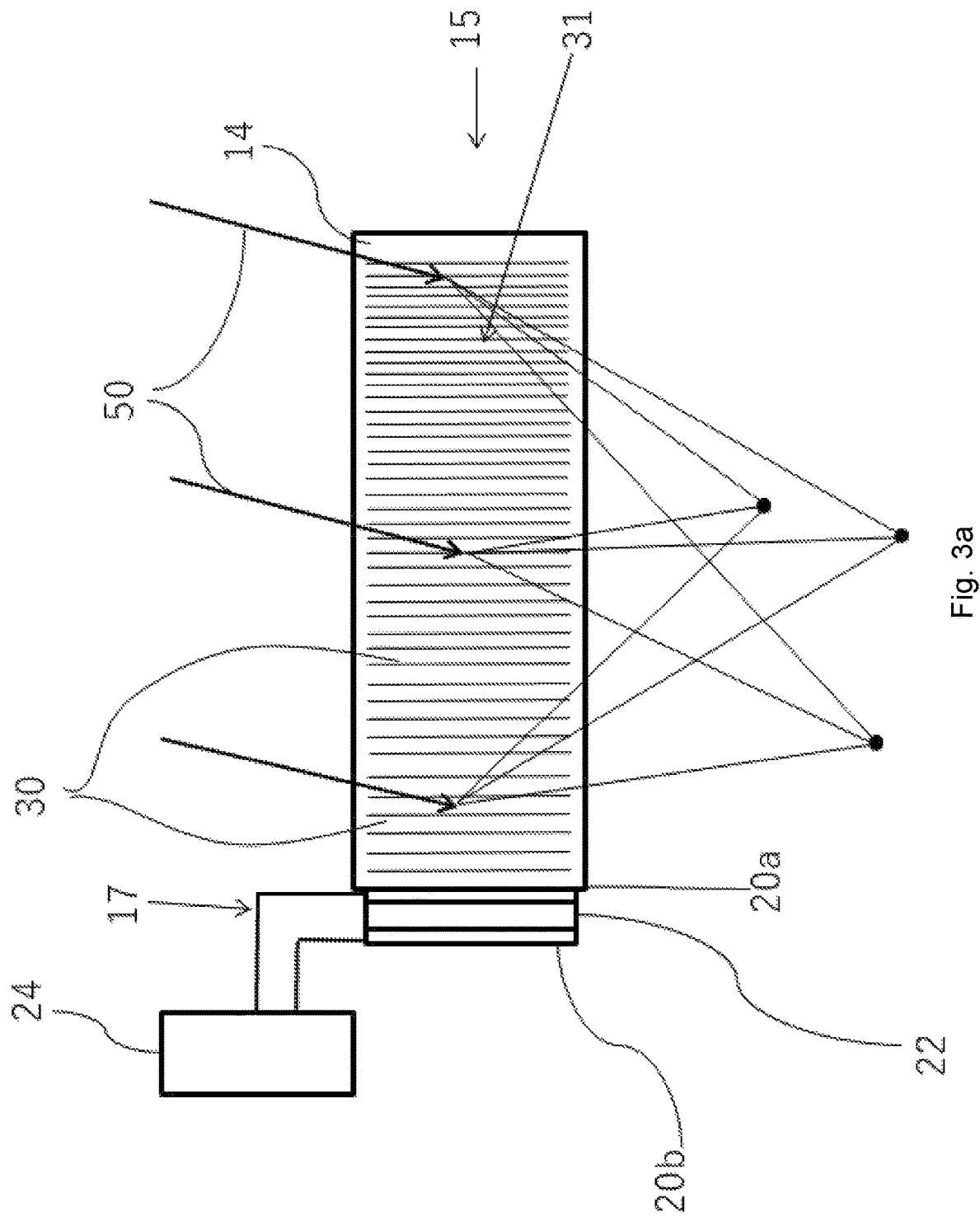

METHOD OF SCANNING AN OPTICAL BEAM USING AN ACOUSTO-OPTIC DEFLECTOR DRIVEN BY CHIRPED ACOUSTIC SIGNALS

CROSS-REFERENCE TO RELATED APPLICATIONS

This application is a U.S. National Stage of PCT/HU2019/050039, filed 14 Aug. 2019, which claims priority of Hungarian Patent Application No. P1800286, filed 14 Aug. 2018, each of which is incorporated herein by reference.

The object of the invention relates to a method for scanning with an optical beam using a first acousto-optic deflector having an optical axis along a Z-axis and at least one acousto-optic crystal layer.

Scanning methods, particularly 3-dimensional laser scanning methods play an important role in the study of biological samples, during which the structure of the biological sample, the distribution of fluorescent markers, and the surface receptors of cells, etc. are mapped out.

The known scanning methods usually use 3-dimensional laser scanning microscopes, which may be confocal or two photon microscopes. In confocal microscope technology a pinhole is placed in front of the detector to filter out light arriving from planes other than the plane of focus of the microscope objective. In this way it is possible to create images of planes in the sample (e.g. biological sample) lying at various depths.

Two photon laser scanning microscopes operate with lower photon energy but greater intensity laser light, from which the simultaneous absorption of two photons is necessary to excite the fluorophore. Subsequently, the emitted fluorescence photon may be detected with a detector.

In the case of the aforementioned technologies, 3-dimensional scanning may also be implemented by moving the microscope stage with a stepper motor, for example, although this method is rarely used in practice due to its slowness and mechanical complexity. Therefore, during the examination of biological samples, instead of moving the sample, the focal point of the laser beam is moved is such a way that the laser beam is deflected in the X-Y plane, and the depth of the focal plane is controlled by moving the objective along the Z-axis.

Several known technologies exist for deflecting laser beams. Usually deflecting mirrors fitted to galvanometric scanners or acousto-optic deflectors are used as deflecting elements. Kaplan et al. ("Acousto-optic lens with very fast focus scanning", OPTICS LETTERS/Vol. 26, No. 14/Jul. 15, (2001)) present a system consisting of two acousto-optic deflectors with which not only can the position of the focal point be moved in the X-Y plane, but also the depth of focus can be varied along the optical axis, constituting the Z-axis, without moving the objective or the stage in the Z direction. According to the description, the depth of focus is changed by changing the sweep rate of a wave that has a frequency that changes with time (chirp signal) generated in the acousto-optic deflectors.

A 3-dimensional scanning system that uses the above principle is disclosed in U.S. Pat. No. 8,559,085, in the case of which the position of the focal point is moved using four acousto-optic deflectors arranged one after the other. The movement of the focal point in the X-Y plane is performed by regulating the frequency difference of the acoustic waves generated in the deflectors, while the position of the focal point in the Z-axis direction is changed with the sweep rate of the chirp signals created in the deflectors. Through this the X, Y and Z coordinates of the focal point can be changed practically independently.

While scanning the sample, the focussed optical beam scans the sample's 2 or 3-dimensional range to be subject to examination. Although acousto-optic deflectors are very fast devices, with which the focal spot can be positioned to the desired location very quickly (even under 10 to 20 microseconds), in the case of a small focal spot and an extensive sample, scanning with a single focal spot is a time-consuming process.

A further problem is presented by the fact that acousto-optic deflectors are only able to create chirp signals within a given frequency range, therefore the given sweep rate chirp signals required for focussing to a given depth may only be necessarily maintained for a limited period of time. FIG. 1 shows the time dependence of the frequencies of chirp signals generated with a method according to the state of the art. The duration $\tau$ of the generated chirp signals is approximately 30 microseconds in a typical arrangement. The focal point created on the boundary of successive chirp signals is of insufficient intensity and size to create fluorescent excitation that may be easily detected. Every chirp signal properly deflects the optical beam when the associated acoustic wave substantially fills the illuminated aperture of the deflector. It was recognised that a chirp signal having a duration of $\tau$ is able to deflect an optical beam resulting in an appropriate fluorescent signal for a duration of approximately $\tau/3$, in other words in the way shown in FIG. 1 the deflection of the optical beam is inappropriate between two successively (one after another) emitted chirp signals for a duration equal to $2\tau/3$. This "idle time" significantly increases the time required for scanning.

The objective of the invention is to provide an acousto-optic scanning method that is free from the disadvantages of the solutions according to the state of the art, in particular to provide an acousto-optic scanning method that enables scanning that is faster than the solutions known of to date.

The invention is based on the recognition that by creating several successive acoustic chirp signals that are also overlapping in time in the acousto-optic deflector, a fluorescent signal can be generated in the sample with suitable intensity without interrupting the optical beam passing through the acousto-optic deflector.

The invention is also based on the recognition that by creating several acoustic chirp signals in the acousto-optic deflector forming substantially simultaneously generated superimposed acoustic waves, the optical beam passing through the deflector may be split up into several beams, and deflected in various directions, thereby making it possible to reduce scanning time.

In the meaning of the invention the task was solved with the method according to claim 1.

Further preferred embodiments of the invention are determined in the independent claims.

Figure 2:
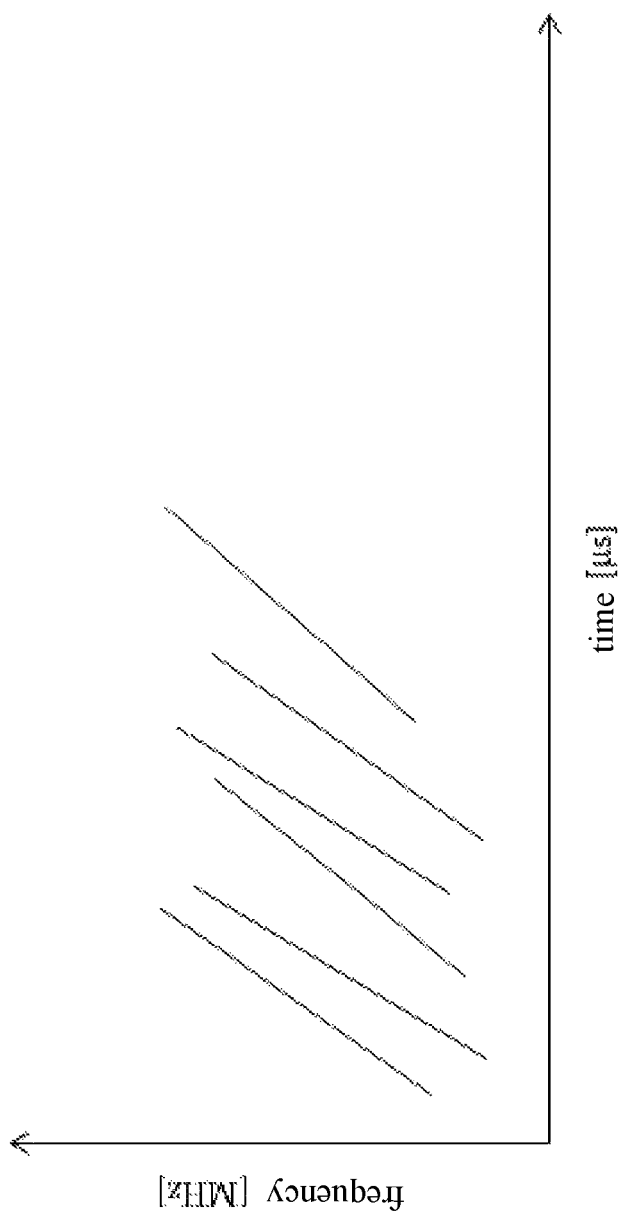
Figure 3B:
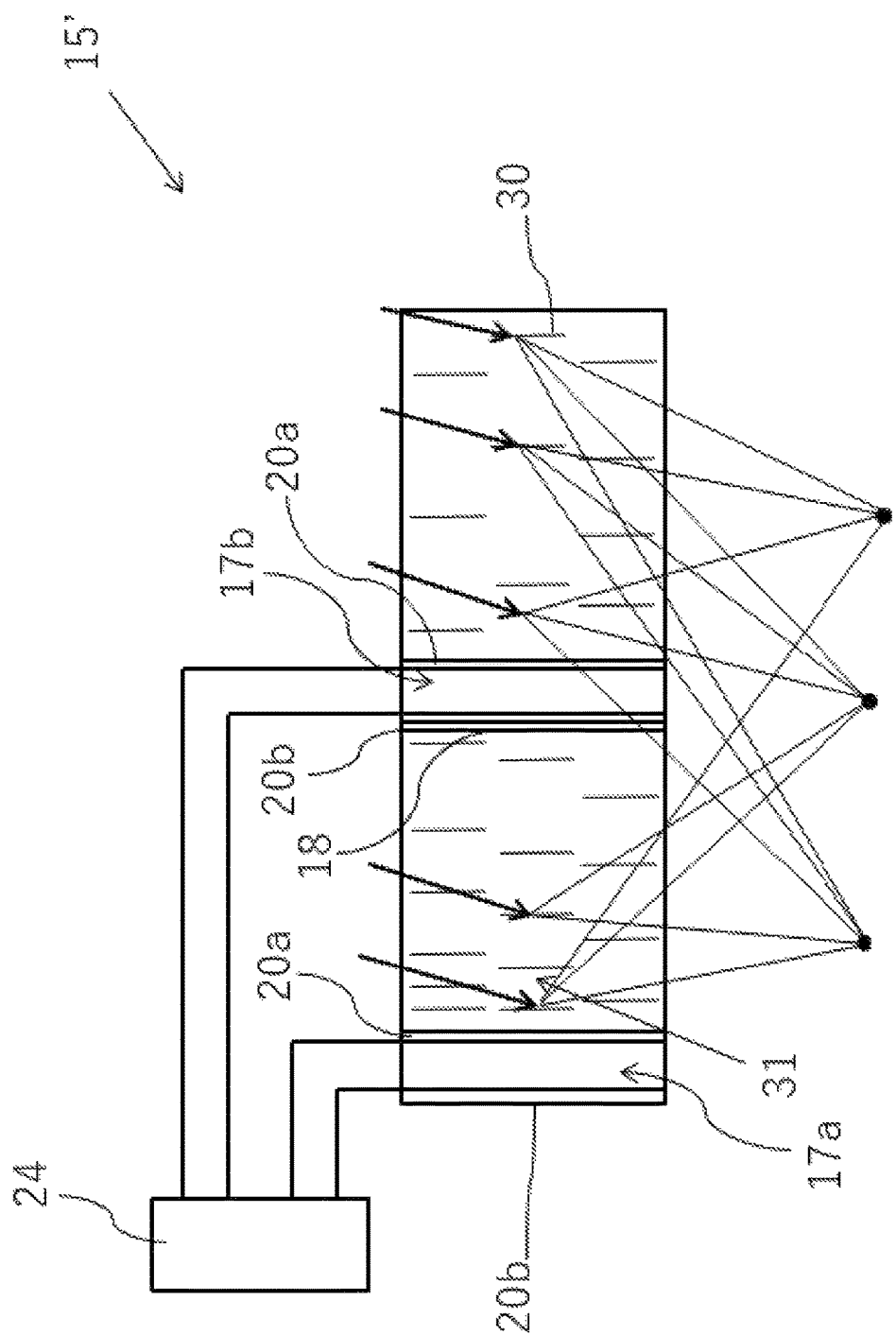
Figure 3C:
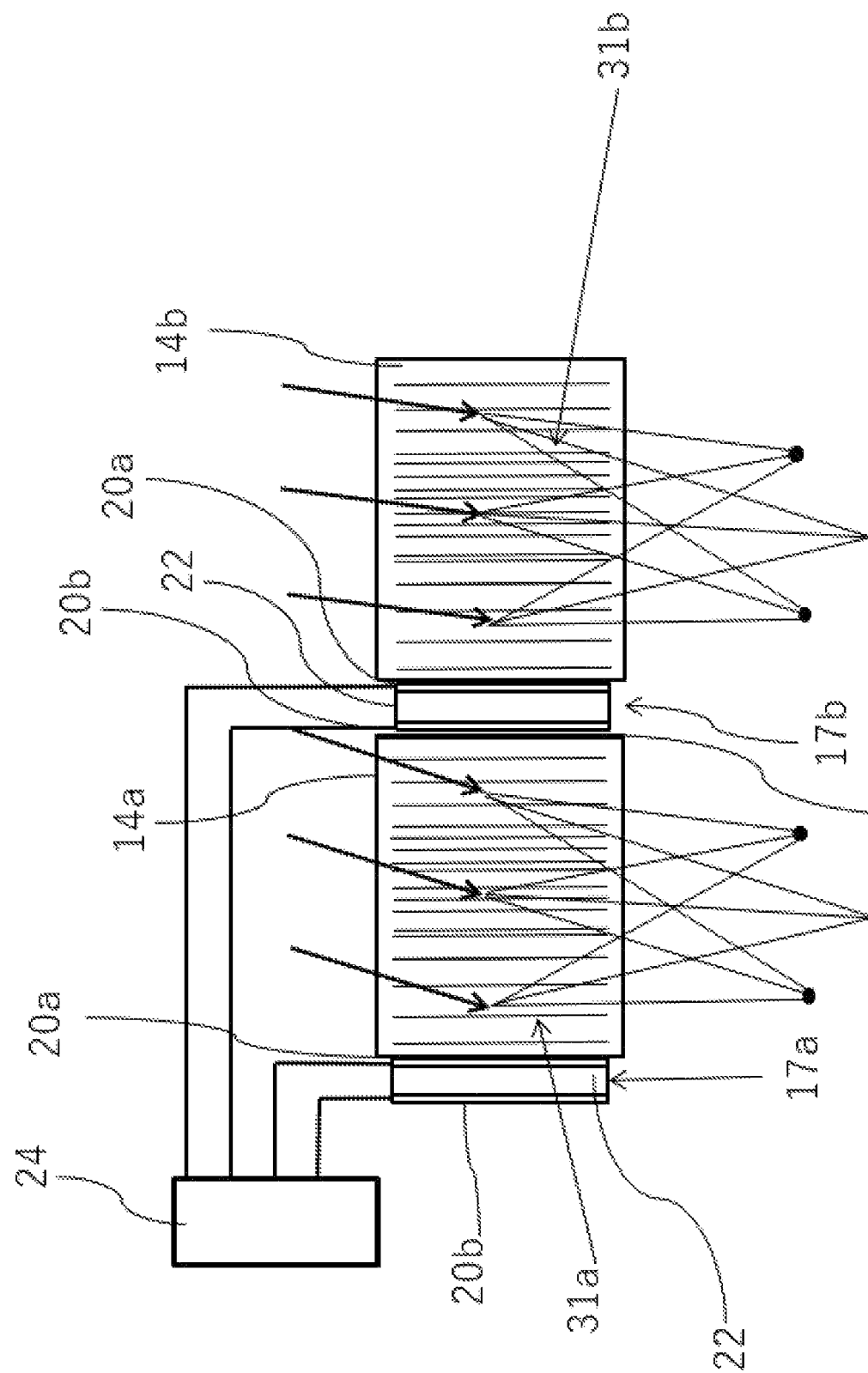
Figure 4A:
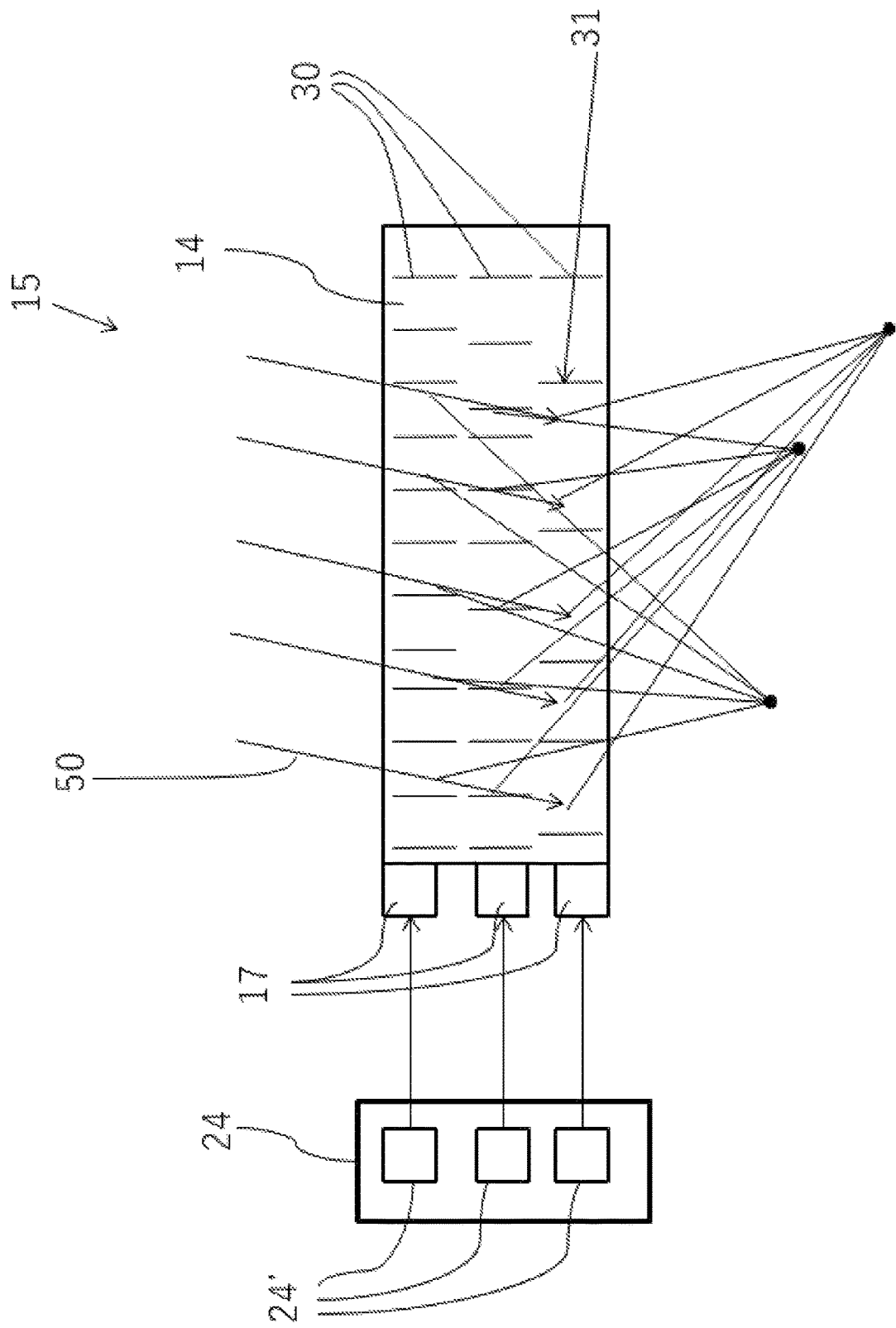
Figure 4B:
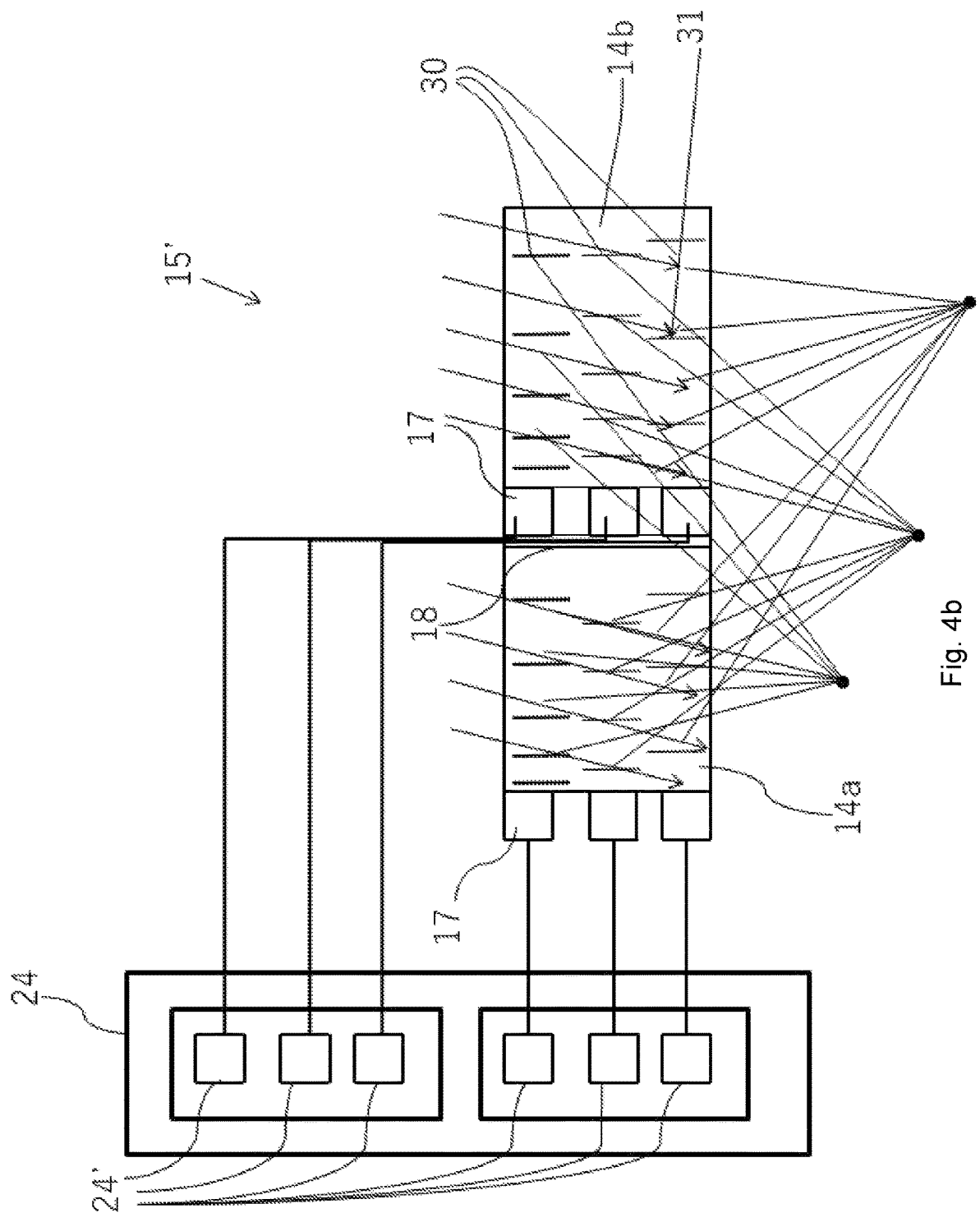
Figure 4C:
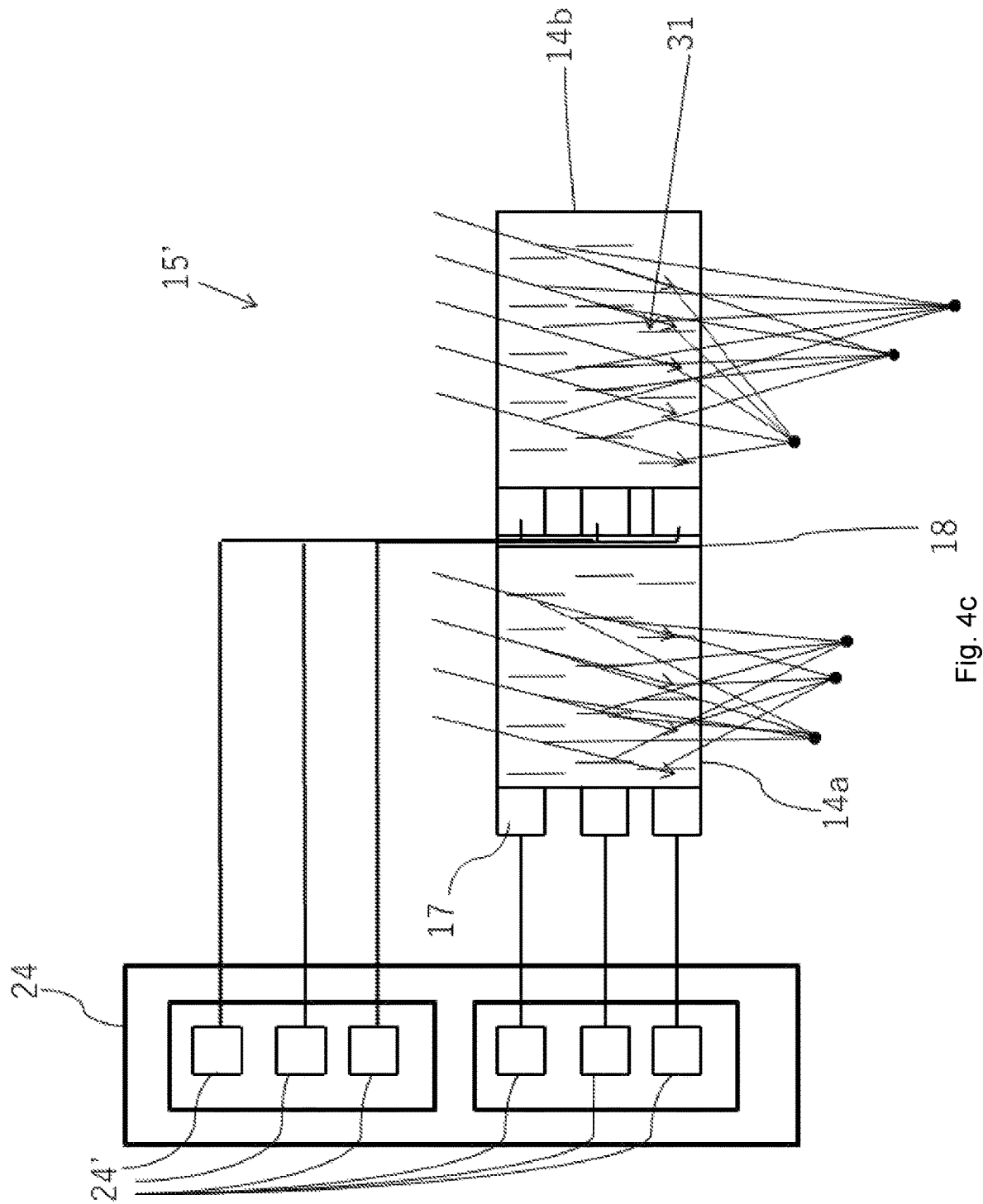
Figure 5C:
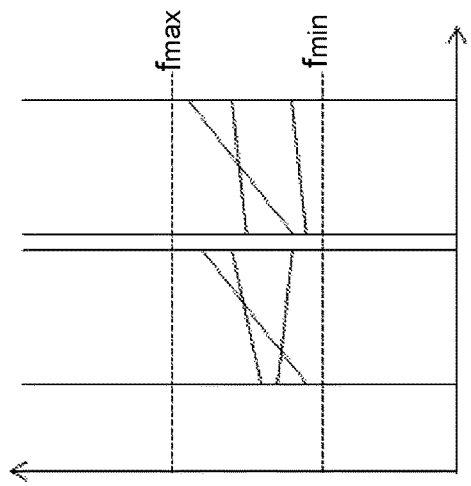
Figure 5B:
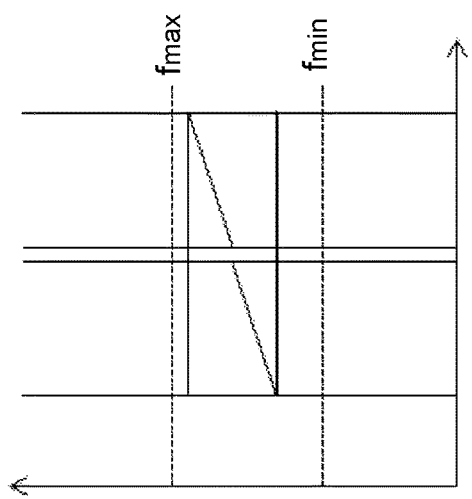
Figure 5A:
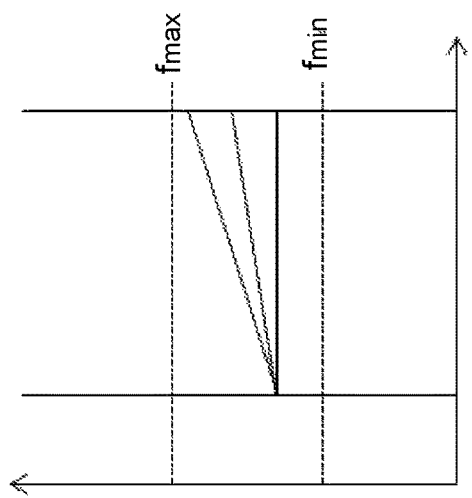
Figure 6:
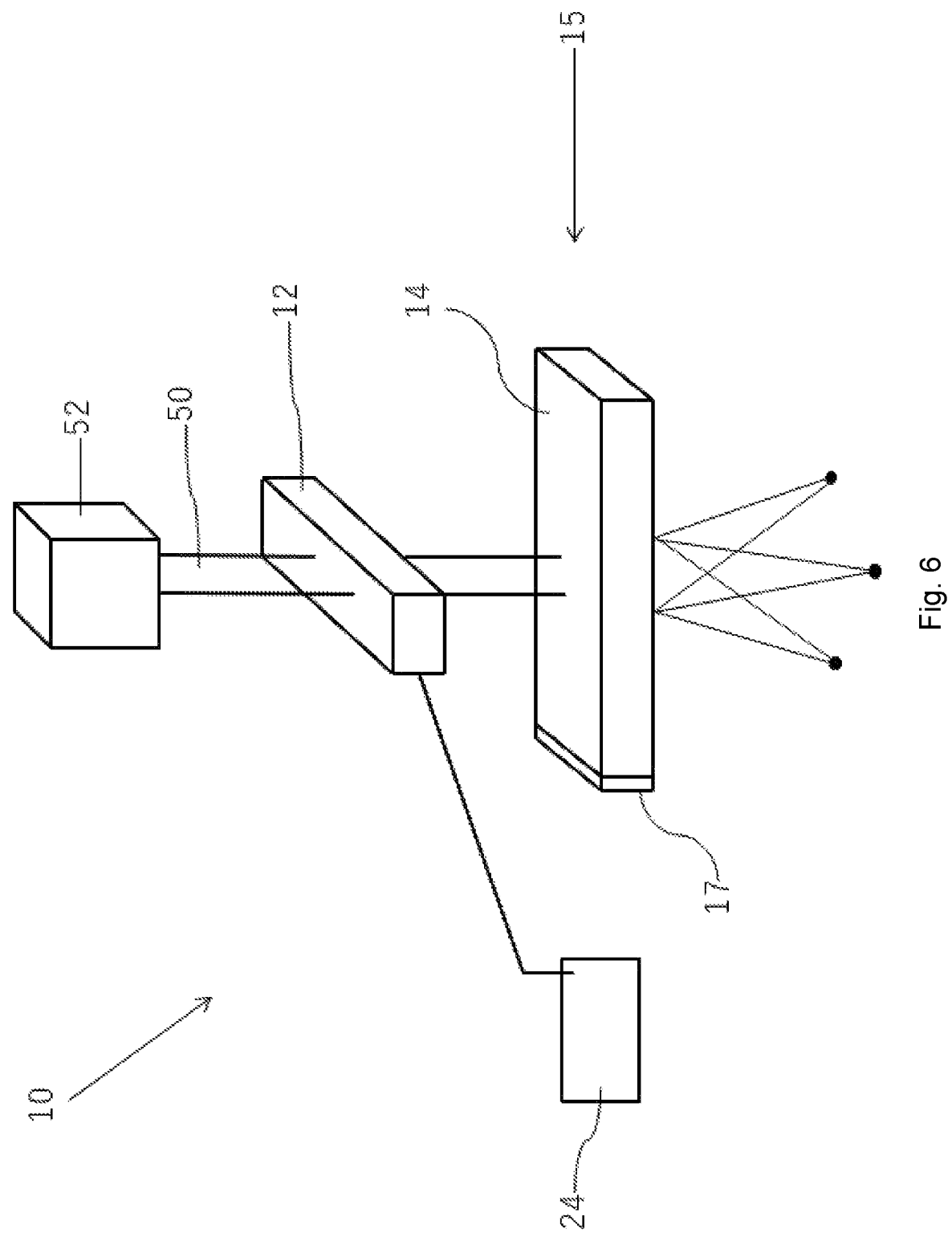
Figure 7:
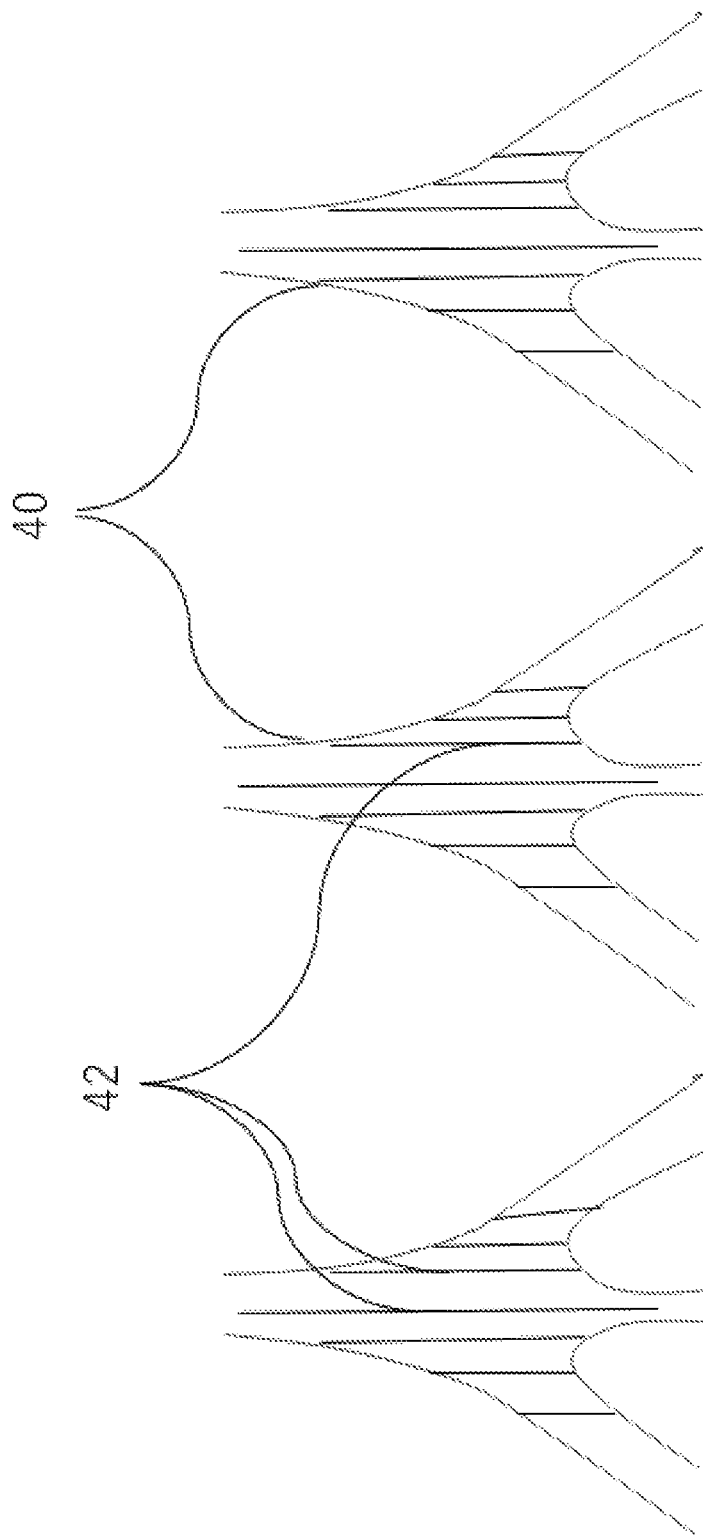
Figure 8:
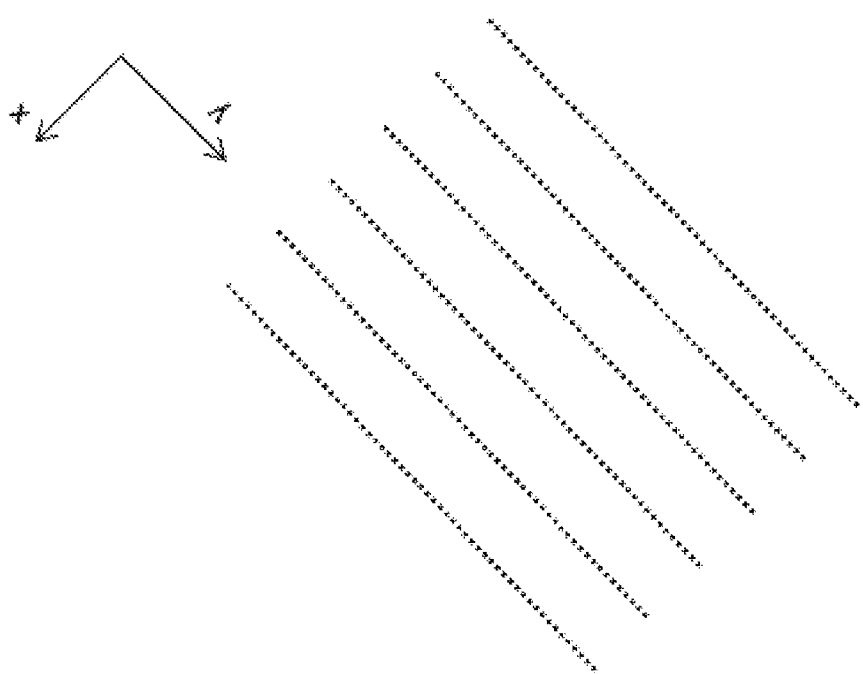
Figure 9:
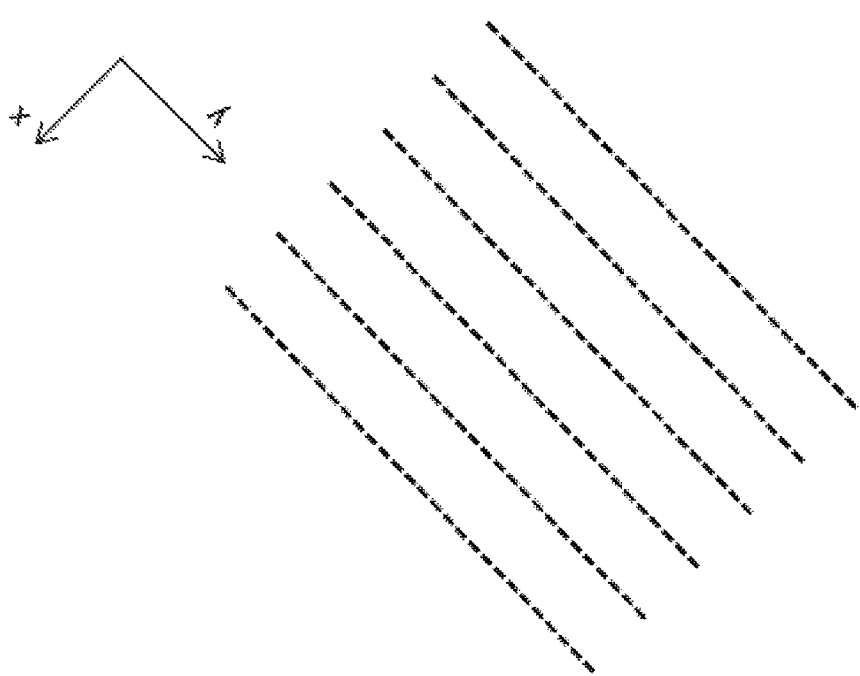

Further details of the invention will be explained by way of exemplary embodiments with reference to figures, wherein:

FIG. 1 is a schematic graph presenting the time dependence of the frequency of chirp signals generated successively using a method according to the state of the art, FIG. 2 is a schematic graph presenting the time dependence of the frequency of chirp signals generated successively using the method according to the invention, FIG. 3a depicts a schematic cross-sectional view of an acousto-optic deflector according to the invention containing a single acousto-optic crystal layer and a single electro-acoustic wave generator during operation, FIG. 3b depicts a schematic cross-sectional view of a preferred embodiment of an acousto-optic deflector according to the invention containing several acousto-optic crystal layers, and a single electro-acoustic wave generator per acousto-optic crystal layer during operation, FIG. 3c depicts a schematic cross-sectional view of another preferred embodiment of an acousto-optic deflector according to the invention containing several acousto-optic crystal layers and a single electro-acoustic wave generator per acousto-optic crystal layer during operation, FIG. 4a depicts a schematic cross-sectional view of an acousto-optic deflector according to the invention containing a single acousto-optic crystal layer and several electro-acoustic wave generators per acousto-optic crystal layer during operation, FIG. 4b depicts a schematic cross-sectional view of a preferred embodiment of an acousto-optic deflector according to the invention containing several acousto-optic crystal layers and several electro-acoustic wave generators per acousto-optic crystal layer during operation, FIG. 4c depicts a schematic cross-sectional view of another preferred embodiment of an acousto-optic deflector according to the invention containing several acousto-optic crystal layers and several electro-acoustic wave generators per acousto-optic crystal layer during operation, FIG. 5a depicts the distance dependence of the frequency of an acoustic wave generated in the acousto-optic deflector depicted on FIGS. 3a and 4a, FIG. 5b depicts the frequency-distance function of an acoustic wave generated in an acousto-optic deflector depicted on FIGS. 3b and 4b, FIG. 5c depicts the frequency-distance function of an acoustic wave generated in an acousto-optic deflector depicted on FIGS. 3c and 4c, FIG. 6 depicts a schematic view of the main elements of a scanning system adapted for implementing the method according to the invention, FIG. 7 depicts a schematic view of samples scanned using the scanning method according to the invention, FIG. 8 depicts a point grid created with a preferred embodiment of the scanning method according to the invention, where the drift of the focal points in the X- and Y-axis directions has been compensated, FIG. 9 depicts a grid consisting of sections in the Y-axis direction created using another preferred embodiment of the scanning method according to the invention, where the focal points drift in the Y-axis direction.

During the method according to the invention the optical beam is deflected in such a way that acoustic chirp signals 30 are generated in a first acousto-optic deflector 15 having a Z-axis optical axis and at least one acousto-optic crystal layer 14, and the optical beam 50 is directed into the deflector 15.

In a preferred embodiment the optical beam 50 contains discrete laser pulses, which pulses have a pulse width in the femtosecond range, and the repetition frequency is preferably in the MHz range. Such laser pulses may be produced using a femtosecond laser pulse source, for example, preferably using a Ti—S laser, as is obvious for a person skilled in the art.

FIG. 3a depicts a schematic cross-sectional view of an embodiment of an acousto-optic deflector 15 according to the invention containing a single acousto-optic crystal layer 14. In the case of this embodiment a single electro-acoustic wave generator 17 adapted for generating acoustic chirp signals 30 is connected to the crystal layer 14, which receives the voltage signals required for generating the acoustic chirp signals 30 from a signal generator 24.

In the context of the present invention acoustic chirp signal 30 is understood to mean a variable frequency, periodic acoustic wave signal, the frequency of which continuously increases or decreases with time. Chirp signals are either linear or nonlinear depending on whether the change in the frequency of the chirp signal is linear or non-linear over time. Linear chirp signals 30 are usually used in acousto-optic deflectors 15 in order to produce stationary focal spots. The use of non-linear chirp signals in acousto-optic deflectors is dealt with in patent document number WO2013/102771A1, for example.

The acoustic chirp signal 30 generated by the wave generator 17 passes through the acousto-optic crystal layer 14, due to the effect of which constantly varying refractive index distribution is created along the direction of propagation. The deflected portion of the initially collimated optical beam 50 passing through the acousto-optic crystal layer 14 filled with the acoustic chirp signal 30, which is at an angle to the propagation direction of the chirp signal 30 will be either converging (focussed) or diverging on exiting the acousto-optic crystal layer 14 depending on whether the frequency of the chirp signal 30 increases or decreases with time. More precisely, in the case when the frequency of the chirp signal 30 created in the crystal layer 14 increases with time, in other words the frequency sweep rate is positive, the deflected portion of the optical beam 50 passing through the crystal layer 14 will be convergent, in other words it will focus. When, however, the frequency of the chirp signal 30 created in the crystal layer 14 decreases with time, in other words the frequency sweep rate is negative the deflected portion of the optical beam 50 passing through the crystal layer 14 becomes divergent and a focal spot is not formed without the intervention of other focusing optical elements. If the frequency sweep rate of the chirp signal 30 is zero (which corresponds to a constant frequency harmonic wave) the deflected portion of the optical beam passing through the crystal layer 14 remains collimated, and is merely deflected. The degree of deflection of the optical beam 50, in other words the axis of the direction of deflection depends on the difference between the greatest and smallest frequency (i.e. the central frequency) of the chirp signal 30 measurable within the optical aperture, as is obvious for a person skilled in the art.

The crystal layer 14 is preferably made from a single crystal (such as $TeO_2$, $LiNbO_3$), in which a diffractive index change occurs due to the effect of mechanical stress. In a preferred embodiment, the electro-acoustic wave generator 17 connected to the acousto-optic crystal layers 14 contains two electrodes 20a, 20b, and a piezoelectric plate 22 arranged therebetween. Of the two electrodes 20a, 20b, the one electrode 20a is connected to the acousto-optic crystal layer 14, while the electrodes 20a, 20b are connected to the signal generator 24. With the voltage connected to the electrodes 20a, 20b being periodically changed by the signal generator 24, the piezoelectric plate 22 is made to vibrate, as is known to a person skilled in the art. The piezoelectric plate 22 transfers its vibration to the acousto-optic crystal layer 14 connected to the electrode 20a, and due to the effect of this an acoustic chirp signal 30 is generated and propagated in the acousto-optic crystal layer 14 that corresponds to the transferred vibration.

The efficiency of the electro-acoustic wave generator 17 is generally optimal in a frequency range determined by a minimum fmin frequency and a maximum fmax frequency, in other words in this range it is most suitable for generating acoustic chirp signals 30. As the frequency of the chirp signals 30 created by the electro-acoustic wave generator 17 constantly changes, after a period of time their frequency will necessarily reach the lower fmin or upper fmax limit of the frequency range, and the generation of the given chirp signal 30 will be interrupted. Generation may be restarted with a frequency falling in the achievable frequency range, creating a new acoustic chirp signal 30. With the interruption of the generation of the chirp signal 30 the deflection of the optical beam 50 passing through the acousto-optic crystal layer 14 into the direction defined by the chirp signal 30 is terminated when the final section of the generated chirp signal 30 leaves the illuminated optical aperture.

Hereinafter, the length of time that elapses between the start of the generation of the chirp signal 30 and the completion of the generation will be referred to as the duration of the chirp signal 30.

The fmin and fmax frequencies may be preferably determined in such a way, that the acoustic output emitted by the wave generator 17 at the fmin and fmax frequencies drops to a half of the maximum acoustic output that may be emitted by the wave generator 17, in other words the acoustic output emitted by the wave generator 17 between the fmin and fmax frequencies changes to less than 50% of the maximum output.

The chirp signal 30 duration is preferably longer than the time aperture of the acousto-optic deflector 15, in other words longer than the length of time during which a given phase point (such as the wave front) of the chirp signal 30 passes over the aperture of the deflector 15. The deflection of the optical beam 50 is suitable as long as a part of the chirp signal 30 generated by the wave generator 17 completely fills the aperture of the deflector 15. According to empirical experience, a chirp signal 30 with a duration τ before and after complete filling does not deflect the entire aperture for the same amount of time as the time aperture of the deflector, in other words it does not properly deflect the beam. In the case of short chirp signals 30, the time aperture may even be longer that τ/3, in other words in such a case the deflector deflects the optical beam properly for a duration of less than τ/3. In the remaining more than 2τ/3 of the time, in other words when the chirp signal 30 has just about started to propagate in the crystal layer 14, or when it has almost completely disappeared from it, the deflection will not work properly.

In the case of the solution according to the state of the art shown in FIG. 1, chirp signals 30 with identical duration τ are generated in the deflector 15 at intervals τ, in other words the next chirp signal 30 only starts to be generated after the generation of the previous chirp signal 30 has discontinued. In this way an "idle time" equal to two time apertures is created between successively generated chirp signals 30, during which the deflection of the optical beam 50 will be inappropriate.

In order to reduce or eliminate the above "idle time", during the method according to the invention several acoustic chirp signals 30 are created in the at least one acousto-optic crystal layer 14 of the acousto-optic deflector 15 in such a way that a first acoustic chirp signal 30a with a duration of τ is generated in the acousto-optic crystal layer 14, then within a duration τ counted from the start of the generation of the first acoustic chirp signal 30a a second acoustic chirp signal 30b is generated in the acousto-optic crystal layer 14. In the context of the present invention, generation within the duration τ also includes the case when the second acoustic chirp signal 30b is generated substantially simultaneously with the first acoustic chirp signal 30a, and also includes the case when the second acoustic chirp signal 30b is created within the duration τ following the start of the generation of the first acoustic chirp signal 30a. In other words, chirp signals 30 are generated in the deflector 15 that either partially or entirely overlap each other in time, thereby at least two acoustic chirp signals 30 may be found in the deflector 15 at any time instance.

The generation of the second acoustic chirp signal 30b is preferably started between the time instances τ/5 and τ/2 following the start of the generation of the first acoustic chirp signal 30a. In the case of the preferred embodiment shown in FIG. 2, acoustic chirp signals 30 with duration τ with identical sweep rate are generated at time intervals τ/3, in this way the chirp signals 30 partially overlap each other in time. The first acoustic chirp signal 30a with duration τ suitably deflects the optical beam 50 between the time instances 5τ/6 and 7τ/6 following its generation, in other words for a total duration of τ/3. As the second acoustic chirp signal 30b is generated at the time instance τ/3 after the start of the generation of the first acoustic chirp signal 30a, the second acoustic chirp signal 30b starts to suitably deflect the optical beam 50 precisely by the time when the deflecting with the first acoustic chirp signal 30a stops, therefore there will always be a chirp signal 30 in the deflector 15 that sufficiently fills the aperture of the deflector 15 and properly deflects the optical beam 50.

In a preferred embodiment more than two chirp signals 30 are generated one after the other in such a way that a third acoustic chirp signal 30c is generated within the duration τ following the start of the generation of the second acoustic chirp signal 30b in such a way that the generation of the third acoustic chirp signal 30c is started between the time instances τ/2 and 4τ/5 following the start of the generation of the first acoustic chirp signal 30a, preferably at the time instance 2τ/3.

Optionally an embodiment is conceivable in the case of which the durations of the successively generated chirp signals 30 are different from each other. In this case the generation of the next chirp signal 30 is started before the generation of the previously generated chirp signal 30 is completed.

In a preferred embodiment, acoustic chirp signals 30 are created in the deflector 15 using a single electro-acoustic wave generator 17 in such a way that a first voltage signal having a duration of τ is connected to the wave generator 17, with which a first acoustic chirp signal 30a is created in the crystal layer 14, then within an interval of τ following the start of the generation of the first acoustic chirp signal 30a, in other words when the generation of the first acoustic chirp signal 30a is still in process, a second voltage signal is connected to the electro-acoustic wave generator 17, with which a second acoustic chirp signal 30b is created.

Optionally, an embodiment is conceivable in the case of which the acoustic chirp signals 30 are created using several electro-acoustic wave generators 17a, 17b connected to the crystal layer 14 in such a way that a first voltage signal having a duration of τ is connected to the first electro-acoustic wave generator 17a with which the first acoustic chirp signal is generated, then within the interval τ after the start of the generation of the first acoustic chirp signal 30a a second voltage signal is connected to a second electro-acoustic wave generator 17b, with which a second acoustic chirp signal 30b is generated.

As the generation of the next chirp signal 30 is started before the generation of the previous chirp signal is completed, at least two acoustic chirp signals 30 are being propagated in the crystal layer 14 of the deflector 15 at every time instance.

The intermediate frequencies, sweep rates and durations of the chirp signals 30 propagated in the crystal layer 14 may optionally also be different to each other. In a preferred embodiment, chirp signals 30 having the same positive sweep rate are generated with a duration τ, the intermediate frequencies of which are selected so that the optical beam 50 is focussed along the X-axis using the first acoustic chirp signal 30a at the first point having a first coordinate X1, and focussed at the second point having a second coordinate X2 using the second acoustic chirp signal 30b.

In another preferred embodiment, various different positive sweep rate chirp signals 30 are generated, and the optical beam 50 passing through the acousto-optic crystal layer is focussed to various depths along the Z-axis. In the case of another embodiment, not only are the positive sweep rates of the chirp signals 30, but also their intermediate frequencies, differ. In this case the optical beam 50 is not only focussed along the Z-axis at various points, but also at various points along the X-axis.

Functioning as a cylindrical lens, the crystal layer 14 containing the positive sweep rate chirp signals 30 is itself capable of focussing the deflected portion of the optical beam 50, as is known to a person skilled in the art, however, the range of focus that may be achieved with this is limited.

Optionally an embodiment is conceivable in the case of which the sweep rate of the chirp signals is zero or negative. In a preferred embodiment, other optical elements may participate in the focussing of the optical beam 50 (such as an objective arranged after the deflector 15). In such a case the deflected portion of the optical beam 50 exiting the crystal layer 14 that is diverging and/or converging (or optionally parallel) according to the algebraical signs of the sweep rates of the acoustic chirp signals 30 is focussed using an optical element arranged after the deflector 15, preferably with an objective. It should be noted that the depth of the focal points in the case of these embodiments also is controlled using the deflector 15, in other words with the sweep rate of the chirp signals 30, in this way the focussing of the optical beam 50 takes place substantially with the deflector 15.

In a particularly preferred embodiment, a superimposed acoustic wave 31 with a duration τ' is generated in such a way that the generation of the second acoustic chirp signal 30b having a duration of τ is started substantially simultaneously with the generation of the first acoustic chirp signal 30a having a duration of τ. In the context of the present invention, superimposed acoustic wave 31 means an acoustic wave consisting of several acoustic chirp signals 30 in which the chirp signals 30 completely overlap both in time and space, in other words their durations, temporal and spatial endpoints are the same. For the sake of clarity, it should be noted that the duration τ' of the superimposed acoustic wave 31 is the same as the duration τ of the chirp signals 30 which make up it. Such a superimposed acoustic wave 31 may be created with a single wave generator 17 in such a way that the voltage signals individually creating the chirp signals 30 forming the superimposed acoustic wave 31 are applied to the electrodes 20a, 20b simultaneously.

In the case of another embodiment, the superimposed acoustic wave 31 is generated using several wave generators 17, all of which are connected to the crystal layer 14 (see FIGS. 3b and 3c). In the case of this embodiment, a chirp signal 30 is simultaneously created with each wave generator 17 in the crystal layer 14, thereby creating the superimposed acoustic wave 31.

The chirp signals 30 forming the superimposed acoustic wave 31 separately deflect the optical beam 50 at the same time in accordance with their frequency profile (sweep rate and intermediate frequency). The deflection also includes the deflection of the individual portions of the optical beam 50, in other words meaning the focussing of the optical beam 50, or, optionally the creation of a diverging or collimated beam.

In the case of the embodiment shown in FIG. 3a, a superimposed acoustic wave 31 is generated containing positive sweep rate chirp signals 30, with which the optical beam 50 is divided into at least two beams along the X-axis and deflected in difference directions.

FIG. 5a shows the spatial distribution of the frequency of the chirp signals 30 forming the superimposed acoustic wave 31 created in the acousto-optic crystal layer 14 according to FIG. 3a. In the case of the present embodiment it is true for each of the created chirp signals 30 that the frequency difference between any two points at an identical distance from each other is constant, in other words a constant, linear function may be fitted to the distance-frequency function. Naturally, a non-linear frequency function may be created using another type of control (in order to move the focal point along a given trajectory, for example).

In a preferred embodiment, several superimposed acoustic waves 31 are created successively in at least one acousto-optic crystal layer 14 of the acousto-optic deflector 15 in such a way that a first superimposed acoustic wave 31a with duration τ' is generated in the acousto-optic crystal layer 14, then within a duration τ' counted from the start of the generation of the first superimposed acoustic wave 31a a second superimposed acoustic wave 31b is generated in the acousto-optic crystal layer 14.

The generation of the second superimposed acoustic wave 31b is preferably started between the time instances τ'/5 and τ'/2 following the start of the generation of the first superimposed acoustic wave 31a. In the case of a particularly preferred embodiment, the duration τ' superimposed acoustic waves 31 are generated at intervals τ'/3, in this way the superimposed acoustic waves 31 partially overlap each other in time.

In the case of a preferred embodiment more than two superimposed acoustic waves 31 are generated successively in such a way that a third superimposed acoustic wave 31c is generated within a duration τ' following the start of the generation of the second superimposed acoustic wave 31b in such a way that the generation of the third superimposed acoustic wave 31c is started between the time instances τ'/2 and 4τ'/5 following the start of the generation of the first superimposed acoustic wave 31a, preferably at the time instance 2τ'/3.

In the case of a particularly preferred embodiment the acousto-optic deflector 15' contains at least two acousto-optic crystal layers 14a, 14b, and at least one acousto-optic wave generator 17a, 17b is connected to each of them, and the neighbouring crystal layers 14a, 14b are separated by an acoustic isolator 18 (see FIGS. 3b, 3c, 4b, 4c). The thickness of the electro-acoustic wave generators 17 arranged between the acousto-optic crystal layers 14 is preferably less than 100 μm in order to obscure as little as possible the optical beam 50 passing through, but, naturally, embodiments are conceivable where the thickness of the wave generators 17 arranged between the crystal layers 14 is greater that 100

µm. Implicitly, the acoustic isolators 18 are designed to have a minimal thickness. Optionally an embodiment is conceivable in the case of which the deflector 15' contains a number N of equal thickness crystal layers 14. Then, in the case of suitable signal generation, the acoustic chirp signal 30 may be generated in the acousto-optic deflector 15' over the entire aperture of the acousto-optic deflector 15' in 1/N of the time as compared to the time in the case of an acousto-optic deflector 15 containing a single (undivided) acousto-optic crystal layer 14 with the same size of aperture.

The function of the acoustic isolator 18 is to prevent the wave generator 17 connected to the neighbouring crystal layer 14 from generating an acoustic wave in an other crystal layer 14. In the case of a preferred embodiment, the acoustic isolator 18 contains an air gap or sound-absorbing material. The chirp signals 30 generated with the wave generator 17 are unable to propagate in the air gap filled with rarefied gas, such as air, or in the absorbent material, due to this the chirp signals 30 propagating in the acousto-optic crystal layer 14 can be prevented from passing over into the neighbouring acousto-optic crystal layer 14 separated by the acoustic isolator 18. It should be noted that although the wave generators 17 and the acoustic isolators 18 of the deflector 15' obscure their respective portion of the optical beam 50, however this obstruction will only cause a slight reduction of the maximum intensity and the appearance of low intensity, supplementary focal points in the Point Spread function (PSF) determining the brightness distribution of the optical beam 50 passing through the deflector 15'. The reduction of maximum intensity results in a slight excitation reduction, in other words the obscuring effects will hardly appear in the intensity distribution of the optical beam 50 passing through the acousto-optic deflector 15' projected onto the given focus plane.

In the case of a preferable embodiment, the acoustic chirp signals 30 are created in the acousto-optic crystal layers 14a, 14b of the acousto-optic deflector by generating a first acoustic chirp signal 30a in the first acousto-optic crystal layer 14a using the first electro-acoustic wave generator 17a connected thereto, and by generating a second acoustic chirp signal 30b in the second acousto-optic crystal layer 14b using the second electro-acoustic wave generator 17b connected thereto. In the case of a particularly preferred embodiment, a first superimposed acoustic wave containing several chirp signals 30 is generated in the acousto-optic crystal layer 14a using the first electro-acoustic wave generator 17a connected thereto, and a second superimposed acoustic wave containing several chirp signals 30 is generated in the second acousto-optic crystal layer 14b using the second electro-acoustic wave generator 17b connected thereto.

In the case of another embodiment, the first electro-acoustic wave generator 17a contains several electro-acoustic wave generator units 17a' and the second acoustic wave generator 17b also contains several electro-acoustic wave generator units 17b'. In the context of the present invention, wave generator unit 17a', 17b' is understood to mean a device connected to the crystal layer that functions as a wave generator 17, in other words that is able to generate an acoustic chirp signal 30 in the crystal layer 14.

In the case of this embodiment, the individual chirp signals 30 forming the superimposed acoustic waves 31 are created using the individual electro-acoustic wave generator units 17a', 17b'.

In the case of the embodiments presented in FIGS. 3b and 4b, a superimposed acoustic wave is created in the acousto-optic deflector 15' containing several acousto-optic crystal layers 14 that fills its entire aperture in such a way that in the individual acousto-optic crystal layers 14a, 14b the spatial section of the superimposed acoustic wave 31 falling on the given acousto-optic crystal layer 14a, 14b is created using the electro-acoustic wave generator 17a, 17b belonging to the given acousto-optic crystal layer 14a, 14b. It is true for all the chirp signals 30 forming the superimposed acoustic wave 31 created in this way that the frequency difference between any two points at an identical distance from each other is constant, in other words a constant, linear function may be fitted to the distance-frequency function (which has a break in the place of the wave generators 17 and acoustic isolators 18) (see FIG. 5b). In this embodiment therefore, in the deflector 15' having several crystal layers 14a, 14b, except for the breaks caused by the electro-acoustic wave generators 17 and acoustic isolators 18 between the neighbouring crystal layers 14, superimposed acoustic waves 31 with duration of τ—similar to the superimposed acoustic waves 31 filling the entire aperture generated in the deflector 15 containing a single crystal layer 14—can be generated that may be made to overlap each other in time in the way presented above.

In the case of the embodiments presented in FIGS. 3c and 4c superimposed acoustic wave signals 31 independent of each other are created in the various acousto-optic crystal layers 14 of the deflector 15' using the electro-acoustic wave generators 17a, 17b belonging to the individual acousto-optic crystal layers 14a, 14b, in other words superimposed acoustic waves 31 that together do not form a superimposed acoustic wave 31 that fills the entire aperture of the deflector 15'. Therefore, in the case of this embodiment optionally the superimposed acoustic waves 31 generated in the various crystal layers 14a, 14b may even contain different numbers of chirp signals 30 (see FIG. 5c).

In the case of the embodiments presented in FIGS. 3a, 3b and 3c, the superimposed acoustic wave 31 is created using the individual electro-acoustic wave generators 17a, 17b connected to each of the crystal layers 14a, 14b in such a way that separate superimposed voltage signals are connected to the electro-acoustic wave generators 17a, 17b, in other words the voltage signal components creating the chirp signals 30 forming the superimposed acoustic wave 31 are connected substantially simultaneously to the electro-acoustic wave generators 17a, 17b. In the case of the embodiments presented in FIGS. 4b and 4c, the electro-acoustic wave generators 17a, 17b connected to the crystal layers 14a, 14b contain several wave generator units 17a', 17b', and the individual chirp signals 30 forming the superimposed acoustic waves 31 are created using the individual electro-acoustic wave generators 17a', 17b'.

The method according to the invention is suitable for the very short duration illumination of a biological samples 40, in particular nerve cells, which involves focussing the optical beam 50 onto the sample 40 at one or several points, in this way inducing two-photon emission, then by moving the one or more focal points the sample 40 is completely scanned.

FIG. 6 shows a schematic view of the main elements of an acousto-optic scanning system 10 having an optical axis along a Z-axis adapted for performing the method according to the invention. The acousto-optic scanning system 10 preferably contains a light source adapted for creating an optical beam 50, a deflecting element 12 adapted for deflecting the optical beam 50 along the X-axis perpendicular to the Z-axis, and an acousto-optic deflector 15 having at least one acousto-optic crystal layer 14 adapted for deflecting the optical beam 50 along the X-axis perpendicular to the Z- and Y-axes. A signal generator 24 adapted for producing voltage signals creating acoustic chirp signals 30 is connected to the wave generator 17 of the deflector 15.

The deflecting element 12 preferably contains a galvanometric scanning mirror, and/or one or two acousto-optic deflectors 35, with which the optical beam 50 passing through the deflecting element 12 may be deflected along the Y-axis, as is known to a person skilled in the art (e.g. U.S. Pat. No. 8,559,085). In the case of a preferred embodiment, the deflector 35 is also controlled with the signal generator 24.

In the first step of an exemplary embodiment of the method according to the invention, an optical beam 50, preferably a laser beam is produced and emitted with the light source 52, then the emitted optical beam 50 is transmitted to the deflecting element 12. Optionally, optical elements that improve the characteristics of the optical beam 50 may be placed between the light source 52 and the deflecting element 12, such as a Faraday isolator, dispersion compensating elements, a laser beam stabilising module, a beam broadening device, an angular dispersion compensation device, etc., as is obvious for a person skilled in the art.

The optical beam 50 is deflected along the Y-axis perpendicular to the optical axis of the optical beam 50. In a preferred embodiment, a chirp signal 30 is generated in the deflector 35 that has the frequency profile $$U(t) = U(0)\cos\left(2\pi\left(f(0)t + \frac{f(t) - f(0)}{f(T)}t^2\right)\right)$$

where t means time, U is the voltage amplitude, and f(t) is the momentary frequency. In the above formula $$f(t) = f(0) + \frac{f(T) - f(0)}{T}t$$

where τ is the signal repetition period—i.e. the length of the chirp, f(0) is the initial and f(T) is the final chirp frequency, as is known to a person skilled in the art. In the case of a particular embodiment, for example a DA4300-12-4M-PCI signal generator with four output channels and one trigger input and one trigger output in combination with a power amplifier may be used as the signal generator 24, but naturally other types of signal generator are conceivable.

In the next exemplary step of the method, the optical beam 50 exiting from the deflecting element 12 passes into the deflector 15, with which the optical beam 50 is deflected. In the case of a particularly preferred embodiment a superimposed acoustic wave 31 containing at least two chirp signals 30 preferably with the same sweep rate are created in the acousto-optic crystal layer 14 using one or more electro-acoustic wave generators 17 controlled by a signal generator 24 and connected to the acousto-optic crystal layer 14, in this way the optical beam 50 is split into at least two beams, and is deflected in different directions along the X-axis.

The chirp signals 30 forming the superimposed acoustic wave 31 deflect the separated portions of the optical beam 50 separately, in accordance with their frequency profile. The positive sweep rate chirp signals 30 focus the parts of the optical beam 50 at various points within the X-Z plane. The negative sweep rate chirp signals 30 make the initially parallel optical beam 50 diverging, in other words a focal point is not created.

In the case of a preferred embodiment, while focussing the parts of the optical beam 50 on at least two points, the diverging or converging beams exiting the acousto-optic deflector 15 are focussed with an optical element, preferably an objective, arranged after the acousto-optic deflector 15. The X-axis coordinate of the focal points may be changed with the intermediate frequency of the chirp signal 30, and the Z-axis coordinate of the focal point may be changed with the sweep rate of the chirp signal (see FIGS. 5a, 5b, 5c).

In the next step of the method according to the invention the optical beam 50 passing into the acousto-optic deflector 15 is displaced along the Y-axis perpendicular to the X- and Z-axes using the deflecting element 12, as a consequence of which the focal points move at the same time along straight lines parallel to each other. Using the parallel lines created in this way, a 2-dimensional surface or optional slice (planar cross-section) of the sample 40 can be scanned (see FIG. 7). The displacement along the Y-axis may be continuous or intermittent. In the case of the former the focal points describe continuous straight lines during the displacement, while in the case of the latter the focal points create series of points to which straight lines may be fitted.

The optical beam 50 deflected by the deflector 15 in one or more directions is continuously displaced (drifts) along the X-axis, as is known to a person skilled in the art. Due to the effect of the drift, the focal points will move along straight lines at an angle to the X- and Y-axes, which are preferably taken into account during scanning. The aforementioned drift may be eliminated in such a way, for example, by using at least two acousto-optic deflectors 15 arranged one after the other in order to focus the parts of the optical beam 50 at several points, in which superimposed acoustic waves 31 are generated that have the same frequency profile, but preferably a different intermediate frequency, and that move in opposite directions.

In the case of a particularly preferable embodiment, scanning is performed in three dimensions with the method according to the invention in such a way that the optical beam 50 passing through the acousto-optic deflector 15 is focussed at different depths along the Z-axis by suitably selecting the sweep rate of the chirp signals 30 forming the superimposed acoustic wave 31. In the case of this embodiment, by displacing the optical beam 50 along the Y-axis the focal points will move along a 3-dimensional surface. In the case of a preferred embodiment, the coordinates of the focal points along the X- and Y-axes are controlled by suitably selecting the intermediate frequencies and sweep rates of the chirp signals 30 in such a way that their deflection along the Y-axis, in other words during scanning, falls on the 3-dimensional surface of the sample 40. In the case of a particularly preferred embodiment the coordinates of the focal points along the Z-axis are continuously varied during scanning to correspond with the surface of the sample 40 to be examined.

In the case of another preferred embodiment the deflecting element 12 of the scanning system 10 contains two acousto-optic deflectors Y1, Y2 deflecting along the Y-axis, and two acousto-optic deflectors X1, X2 deflecting along the X-axis. A chirp signal 30 with the same sweep rate is connected to each of the deflectors Y1, Y2 of the deflecting element 12, and to the deflector X1 deflecting along the X-axis. A superimposed acoustic wave containing several chirp signals 30 is created in the deflector X2, in the case of which the sweep rate of the chirp signals 30 is the same as the sweep rate of the chirp signals 30 of the superimposed acoustic waves 31 created in the deflectors Y1, Y2, X1. Chirp signals 30 preferably travelling in opposite directions are generated in the acousto-optic deflectors deflecting along the same axis, in other words, for example, the chirp signals 30 of the deflectors Y1 and Y2 travel in directions opposite to each other. As the sweep rates of the chirp signals 30 generated in the deflectors X1, X2, Y1, Y2 are the same, and chirp signals 30 travelling in opposite directions are generated in the deflector pair Y1 and Y2 deflecting along the Y-axis and in the deflector pair X1 and X2 deflecting along the X-axis, the focal points created will not drift, neither along the X-axis nor the Y-axis. The focal points are focussed along the Y-axis to the locations determined in accordance with the intermediate frequency difference of the chirp signals 30 created in the deflector pair Y1 and Y2, therefore the point grid shown in FIG. 8 is created during scanning. The points (focal points) of the point grid created are located at the same depth Z, therefore the scanning takes place in constant planes Z. After a given plane has been completely scanned, i.e. covered with the point grid, the sweep rate of the chirp signals 30 in each of the deflectors X1, X2, Y1, Y2 is changed, and scanning is performed once again in a plane parallel to the previous plane at a different depth. This allows a 3-dimensional sample to be completely scanned across planes.

Another preferred embodiment differs from the above embodiment only in that a chirp signal 30 is connected to the deflector Y2 with a different sweep rate to the sweep rate of the chirp signals 30 connected to the deflectors X1, X2, Y1, due to the effect of which the focal points will drift along the Y-axis. Instead of the point grid, in this case a grid will be drawn consisting of sections in the Y direction (see FIG. 9).

Optionally, in the case of all of the embodiments presented above, a acousto-optic deflector 15 may be used that contains at least two acousto-optic crystal layers 14a, 14b preferably separated by acoustic isolators 18. In this case, a first superimposed acoustic wave 31a containing several chirp signals 30 is created in a first acousto-optic crystal layer 14a using a first electro-acoustic wave generator 17a connected to the first acousto-optic crystal layer 14a, and a second superimposed acoustic wave 31b containing several chirp signals 30 is created in a second acousto-optic crystal layer 14b using a second acousto-optic wave generator 17b connected to the second acousto-optic crystal layer 14b and arranged between the first acousto-optic crystal layer 14a and the second acousto-optic crystal layer 14b.

Various modifications to the above disclosed embodiments will be apparent to a person skilled in the art without departing from the scope of protection determined by the attached claims.

The invention claimed is:

1. Method for scanning with an optical beam (50) using a first acousto-optic deflector (15, 15') having an optical axis along a Z-axis and at least one acousto-optic crystal layer (14), characterised by directing the optical beam (50) into the first acousto-optic deflector (15, 15'), and deflecting the optical beam (50) along an X-axis being perpendicular to the Z-axis by means of the first acousto-optic deflector (15, 15'), during which a plurality of acoustic chirp signals (30) are generated in the at least one acousto-optic crystal layer (14) of the acousto-optic deflector (15, 15') by generating a first acoustic chirp signal (30a) having a time duration of $\tau$ in the acousto-optic crystal layer (14) using a single electro-acoustic wave generator (17) connected to the crystal layer (14) by applying a first voltage signal to the electro-acoustic wave generator, then generating a second acoustic chirp signal (30b) in the acousto-optic crystal layer (14) within a $\tau$ period of time counted from the start of the generation of the first acoustic chirp signal (30a) by applying a second voltage signal to the electro-acoustic wave generator while the first acoustic chirp signal (30a) is generated;

wherein said acoustic chirp signals (30a, 30b) are at least partially overlapping in the crystal layer (14).

2. Method according to claim 1, characterised by starting to generate the second acoustic chirp signal (30b) between the time instances $\tau/5$ and $\tau/2$.

3. Method according to claim 1, characterised by generating a third acoustic chirp signal (30c) within a period of time of $\tau$ following the start of the generation of the second acoustic chirp signal (30b).

4. Method according to claim 3, characterised by starting to generate the third acoustic chirp signal (30c) between the time instances $\tau/2$ and $4\tau/5$ following the start of the generation of the first acoustic chirp signal (30a).

5. Method according to claim 1, characterised by generating acoustic chirp signals (30) with various sweep rates, and focusing the optical beam (50) passing through the acousto-optic crystal layer (14) at various depths along the Z-axis.

6. Method according to claim 1, characterised by focusing the beams exiting the acousto-optic crystal layer (14), diverging and/or converging according to the algebraical signs of the sweep rates of the acoustic chirp signals (30), using an optical element, preferably an objective, arranged after the first acousto-optic deflector (15).

7. Method according to claim 1, characterised by focusing the optical beam (50) along the X-axis using the first acoustic chirp signal (30a) to a first point having a first coordinate X1, and using the second acoustic chirp signal (30b) to focus the optical beam (50) to a second point having a second coordinate X2.

8. Method according to claim 1, characterised by creating a superimposed acoustic wave (31) by generating the second acoustic chirp signal (30b) substantially simultaneously with the first acoustic chirp signal (30a), and splitting the optical beam (50) into two beams along the X-axis using the superimposed acoustic wave (31) and deflecting them into various directions.

9. Method according to claim 8, characterised by creating a plurality of superimposed acoustic waves (31) successively in the acousto-optic crystal layer (14) by generating a first superimposed acoustic wave (31a) with a duration of $\tau'$ in the acousto-optic crystal layer (1), then generating a second superimposed acoustic wave (31b) within a $\tau'$ period of time following the start of the generation of the first superimposed acoustic wave (31a).

10. Method according to claim 9, characterised by starting to generate the second superimposed acoustic wave (31b) between the time instances $\tau'/5$ and $\tau'/2$ following the start of the generation of the first superimposed acoustic wave (31a).

11. Method according to claim 9, characterised by generating a third superimposed acoustic wave (31c) within a $\tau'$ period of time following the start of the generation of the second superimposed acoustic wave (31b).

12. Method according to claim 11, characterised by starting to generate a third superimposed acoustic wave (31c) between the time instances $\tau'/2$ and $\tau'/5$ following the start of the generation of the first superimposed acoustic wave (31a).

13. Method according to claim 8, characterised by the acousto-optic deflector (15') containing at least two acousto-optic crystal layers (14a, 14b), and generating the first superimposed acoustic wave (31a) in a first acousto-optic crystal layer (14a) using a first electro-acoustic wave generator (17a) connected to the first acousto-optic crystal layer (14a), and generating a second superimposed acoustic wave (31b) in a second acousto-optic crystal layer (14b) using a second electro-acoustic wave generator (17b) connected to the second acousto-optic crystal layer (14b).

14. Method according to claim 13, characterised by the acousto-optic deflector (15) containing at least two acousto-optic crystal layers (14a, 14b), and creating the first acoustic chirp signal (30a) in a first acousto-optic crystal layer (14a) using a first electro-acoustic wave generator (17a) connected to the first acousto-optic crystal layer (14a), and creating the second acoustic chirp signal (30b) in a second acousto-optic crystal layer (14b) using a second electro-acoustic wave generator (17b) connected to the second acousto-optic crystal layer (14b).

15. Method according to claim 1, characterised by deflecting the optical beam (50) along a Y-axis perpendicular to the Z- and X-axes.

16. Method according to claim 1, characterised by the electro acoustic wave generator (17) connected to the acousto-optic crystal layers (14) containing two electrodes (20a, 20b), and a piezoelectric plate (22) arranged therebetween, and the one electrode (20a) of the two electrodes (20a, 20b) being connected to the acousto-optic crystal layer (14).

17. Method according to claim 1, characterised by starting to generate the second acoustic chirp signal (30b) at time instance $\tau/3$.

18. Method according to claim 3, characterised by starting to generate the third acoustic chirp signal (30c) at time instance $2\tau/3$.

19. Method according to claim 8, characterised by starting to generate the second superimposed acoustic wave (31b) at time instance $\tau'/3$.

20. Method according to claim 11, characterised by starting to generate the third superimposed acoustic wave (31c) at time instance $2\tau'/3$.

* * * * *